United States Patent
Norman et al.

(10) Patent No.: US 12,422,622 B2
(45) Date of Patent: Sep. 23, 2025

(54) PHOTONIC SYSTEMS COMPRISING AN ASYMMETRIC COUPLER AND METHODS OF FABRICATION

(71) Applicant: Quintessent Inc., Goleta, CA (US)

(72) Inventors: Justin Colby Norman, Goleta, CA (US); Michael Davenport, Santa Barbara, CA (US); Michael Lawrence Belt, Goleta, CA (US)

(73) Assignee: Quintessent Inc., Goleta, CA (US)

( * ) Notice: Subject to any disclaimer, the term of this patent is extended or adjusted under 35 U.S.C. 154(b) by 392 days.

(21) Appl. No.: 18/073,226

(22) Filed: Dec. 1, 2022

(65) Prior Publication Data
US 2023/0168431 A1    Jun. 1, 2023

Related U.S. Application Data

(60) Provisional application No. 63/285,011, filed on Dec. 1, 2021.

(51) Int. Cl.
*G02B 6/293*  (2006.01)
*G02F 1/025*  (2006.01)
(Continued)

(52) U.S. Cl.
CPC ......... *G02B 6/29338* (2013.01); *G02F 1/025* (2013.01); *G02F 1/225* (2013.01);
(Continued)

(58) Field of Classification Search
CPC ............ G02B 6/29331; G02B 6/29335; G02B 6/29338; G02B 6/12; G02B 6/12004;
(Continued)

(56) References Cited

U.S. PATENT DOCUMENTS 5,878,070 A * 3/1999 Ho ............. H01S 5/1075
                                                        385/32
8,610,994 B1 * 12/2013 Lentine ............. G02F 1/0147
                                                        359/279
(Continued)

FOREIGN PATENT DOCUMENTS

CN         112415788 A  *  2/2021  ............. G02F 1/025

OTHER PUBLICATIONS

"Design of Tight Bends in Silicon-on-Insulator Ridge Waveguides" by Harjanne et al., Physica Scripta. vol. T114, pp. 209-212 (Year: 2004).*

(Continued)

*Primary Examiner* — Robert Tavlykaev
(74) *Attorney, Agent, or Firm* — Stuart H. Mayer; Kaplan Breyer Schwarz, LLP

(57) ABSTRACT

The present disclosure is directed toward photonic elements comprising rib-waveguide-based ring resonators having high coupling efficiency between their bus and ring waveguides within the coupling region of the ring resonator, as well as operability over a wide spectral range. Embodiments disclosed herein employ a small-diameter ring waveguide and a bus waveguide that collectively define an asymmetrical coupler having a coupling region at which the optical confinement of the bus waveguide is stronger on side of the bus waveguide distal to the ring waveguide than on the side of the bus waveguide that is proximal to the ring waveguide. In some embodiments, in the coupling region, the bus waveguide has ridge and an inner bus-slab portion that is shared with the ring waveguide, while the outer bus-slab portion is at least partially removed to give rise to stronger optical confinement at the outer edge of the ridge of the bus waveguide.

21 Claims, 4 Drawing Sheets

(51) Int. Cl.
*G02F 1/225* (2006.01)
*G02B 6/12* (2006.01)

(52) U.S. Cl.
CPC .............. *G02B 2006/12097* (2013.01); *G02F 2201/063* (2013.01)

(58) Field of Classification Search
CPC .......... G02B 6/125; G02B 2006/12147; G02F 1/225; G02F 1/3132; G02F 2203/15
USPC .............................. 385/1–3, 4, 9, 30, 32, 41
See application file for complete search history.

(56) References Cited

U.S. PATENT DOCUMENTS

| | | | | |
|---|---|---|---|---|
| 9,851,505 | B2 * | 12/2017 | Oka ........................ | G02B 6/125 |
| 10,473,858 | B1 * | 11/2019 | Mahgerefteh ............ | G02B 6/14 |
| 11,409,044 | B2 * | 8/2022 | Su ........................ | G02B 6/2773 |
| 2015/0338577 | A1 * | 11/2015 | Shi ........................ | G02B 6/125 |
| | | | | 385/11 |
| 2016/0238860 | A1 * | 8/2016 | Liang ...................... | H01S 5/026 |
| 2017/0068048 | A1 * | 3/2017 | Kamei .................. | G02B 6/1228 |
| 2022/0229346 | A1 * | 7/2022 | Blanco-Redondo ......................... | |
| | | | | G02B 6/12007 |
| 2023/0079367 | A1 * | 3/2023 | Huang ................. | G01N 21/255 |
| | | | | 356/326 |

OTHER PUBLICATIONS

Erman Timurdogan et al., "An Interior-Ridge Silicon Microring Modulator," Journal of Lightwave Technology, Dec. 15, 2013, DOI: 10.1109/JLT.2013.2278761, pp. 3907-3914, vol. 31, No. 24.

Po Dong et al., "Wavelength-tunable silicon microring modulator," Optics Express, May 10, 2010, Optical Society of America, pp. 10941-10946, vol. 18, No. 11.

* cited by examiner

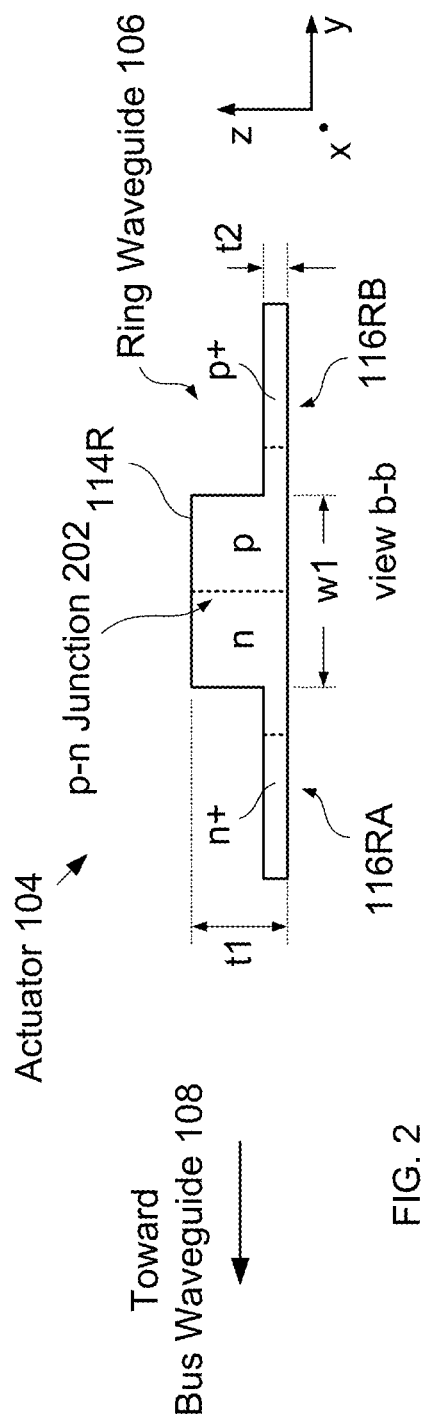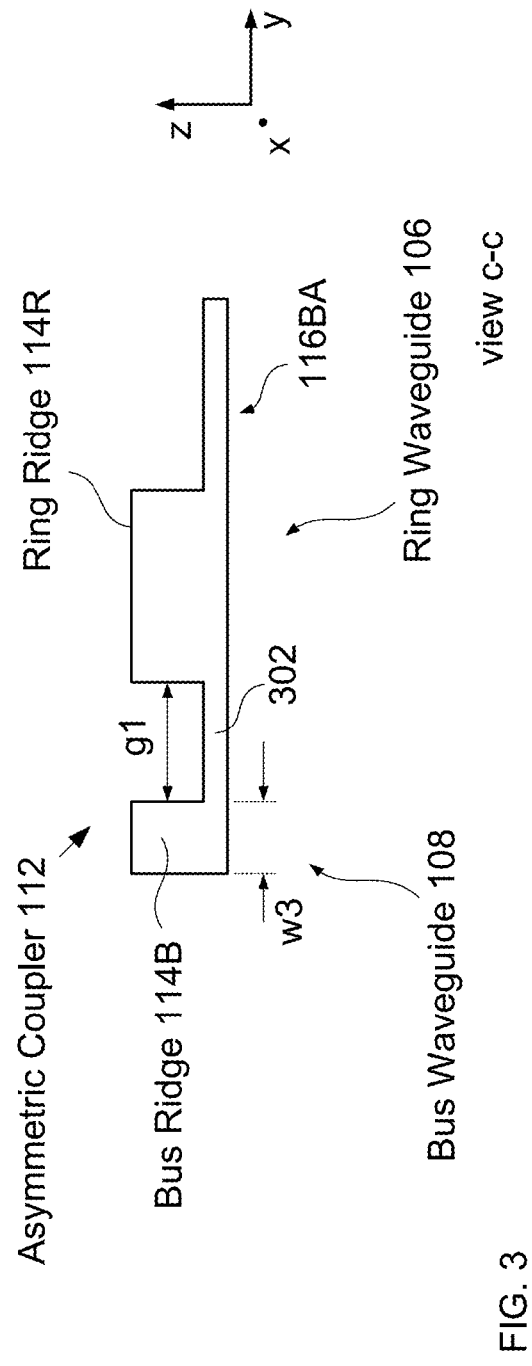

PHOTONIC SYSTEMS COMPRISING AN ASYMMETRIC COUPLER AND METHODS OF FABRICATION

STATEMENT OF RELATED CASES

This case claims priority to U.S. Provisional Patent Application Ser. No. 63/285,011 filed on Dec. 1, 2021, which is incorporated herein by reference.

TECHNICAL FIELD

The present disclosure relates to photonic devices in general, and, more particularly, to photonic elements comprising at least one directional coupler, such as spectral filters, optical modulators, optical power splitters and combiners, and the like.

BACKGROUND

Advances in silicon photonics are expected to be key for addressing performance issues arising from bandwidth limitations, latency, and power-consumption in many applications, such as wavelength-division multiplexed (WDM) systems used in high-bandwidth telecommunications, data communications, high-volume datacenters, and high-performance computing.

The "ring resonator" is a silicon-photonic element that is fundamentally important to many devices and sub-systems, such as optical modulators, spectral filters, optical power splitters/combiners, and the like. A ring resonator comprises a closed-loop waveguide (hereinafter referred to as a "ring") and a bus waveguide, which are separated by a small gap in a "coupling region" to collectively define a directional coupler. The ring is characterized by at least one "resonance wavelength." As light characterized by this "operating wavelength" is conveyed to the coupling region by the bus waveguide, its optical energy can evanescently couple between the ring and bus waveguide. For light signals having wavelengths not at the operating wavelength, their optical energy substantially remains in the bus waveguide and "passes through" the ring resonator.

As will be apparent to one skilled in the art, high-bandwidth WDM systems typically include transmission links that carry a large number of wavelength channels that collectively define a large spectral range. In addition, such transmission links normally have very tight optical-loss margins. In order to accommodate operation over a wide spectral range, a ring resonator must have a large free-spectral range (FSR), which requires that the ring has a very small diameter. But the resonator must simultaneously mitigate negative impact on link margin for all wavelength channels other than the channel at its operating wavelength. As a result, a high coupling coefficient between the ring and bus waveguides at the directional coupler is necessary to avoid excess pass-through loss. Furthermore, a high coupling coefficient can be desirable in many applications because it limits the quality factor (Q) of the ring, which enables higher-speed modulation.

Attempts to simultaneously realize both large FSR and high coupling coefficient have included the development of ring resonators having curved directional couplers, in which the bus waveguide is curved around a portion of the ring (commonly referred to as a "pulley coupler"). This waveguide arrangement increases the interaction length over which evanescent coupling can occur (i.e., the coupling region) as compared to a straight bus waveguide. The transition from the curved bus waveguide into the coupling region is also more adiabatic, reducing excess loss.

To achieve a high coupling coefficient, the propagation constants in the ring and curved bus waveguides must be closely matched (i.e., the waveguides must be "beta-matched"). Unfortunately, since a curved bus waveguide lies outside the ring, it inherently has a larger radius, which gives rise to a different propagation constant. To compensate for the difference in their bending radii, therefore, the bus waveguide must be correspondingly narrower than the ring waveguide.

Unfortunately, practical beta-matched directional couplers having large FSR have proven difficult to realize for several reasons. First, the width of the ring waveguide is already quite small to support single-mode operation. Second, a very small ring radius is needed for large FSR to support operation over many wavelength signals in a multi-wavelength system. As a result, the ring waveguides normally already have as small a bend radius as can be tolerated without incurring significant bending loss. Third, bending loss in a waveguide increases as its width decreases; therefore, a very narrow curved bus waveguide will have dramatically higher radiation loss.

One prior-art attempt to realize a tightly bent curved directional coupler is disclosed by Timurdogan, et al., in "An Interior-Ridge Silicon Microring Modulator," *J. Lightwave Tech.*, Vol. 31, pp. 3907-3914 (2013), which is incorporated herein by reference. In this approach, a ring resonator comprises a ring that is an "interior-ridge waveguide" and a bus waveguide that is a channel waveguide (i.e., a waveguide having no planar (i.e., "slab") portion on either side). An interior-ridge-waveguide ring is analogous to a rib-waveguide ring in which the slab portion on the outside of the ring is removed. While the lack of a slab portion reduces bending loss and enables smaller minimum bending radii, the increased optical confinement means a smaller mode overlap between the optical modes propagating in the ring and bus waveguides, thereby requiring a significantly smaller gap between them in the coupling region. This constrains the maximum coupling coefficient, which in turn will reduce the photon-lifetime limited bandwidth. Furthermore, although these very narrow coupling gaps can be fabricated using advanced lithography technology, the cost is prohibitive for many applications.

An interior-ridge-waveguide ring can be configured as a modulator by doping its ring to form "spokes" of p-n junctions. Unfortunately, this spoked-ring configuration has an additional disadvantage in that intricate implantation and metallization schemes are necessary, which introduces a perimeter of p-n junction along the spokes that has no overlap with the optical field, thereby increasing reverse current and degrading electrical efficiency.

Another prior-art attempt to realize a tightly bent curved directional coupler is disclosed by Dong, et al., in "Wavelength-tunable silicon microring modulator," *Optics Express*, Vol. 18, pp. 10941-10946 (2010), which is incorporated herein by reference. In this approach, a ring resonator comprises ring and bus waveguides that are "partially etched," rib waveguides. A partially etched rib waveguide has slab portions that are etched more deeply than normal, thereby increasing their optical confinement and reducing bending loss. As a result, the partially etched waveguides can have smaller bend radii.

Partially etched waveguides can employ larger coupling gaps while retaining a high coupling coefficient, enabling the use of lower-cost lithography technology. However, a partially etched waveguide has reduced optical confinement compared to a fully etched waveguide, which increases its minimum bend radius. A larger bend radius limits the FSR of a partially etched waveguide, reducing the number of wavelengths on which it can operate. In other words, partially etched directional couplers require a tradeoff between minimum attainable bend radius and optical mode confinement.

For each of these prior-art approaches, the need to reduce the width of the bus waveguide to compensate for a mismatch in the propagation constants of the ring and bus waveguides gives rise to undesirable excess loss due to the bend of the bus waveguide, making them poorly suited for many applications.

The need for a practical directional coupler suitable for use in silicon photonics devices remains, as yet, unmet in the prior-art.

SUMMARY

The present disclosure is directed to silicon-photonics devices and systems that include at least one ring resonator having a curved directional coupler, where its coupling region is characterized by a rib waveguide having an asymmetric slab that enables large FSR and large coupling gap, thereby making low-cost practical systems possible. Ring resonators in accordance with the present disclosure are particularly well suited for use in photonic devices such as optical modulators, spectral filters, optical power splitters, optical power combiners, and the like.

Like ring resonators known in the prior art, a ring resonator in accordance with the present disclosure includes a directional coupler comprising a ring waveguide and a bus waveguide that is curved around the outside of the ring waveguide to define a coupling region wherein evanescently coupling between the two waveguides is enabled.

In sharp contrast to the prior art, embodiments in accordance with the present disclosure include a rib-waveguide-based directional coupler in which the slab of the bus waveguide is asymmetric such that its slab portions on the inside (its inner bus-slab portion) and outside of the ridge (its outer bus-slab portion) are different. Specifically, in the coupling gap region of the directional coupler, the bus and ring waveguides are configured such that a slab portion located between the ring and bus waveguides is shared and has a first thickness, while the outer ring-slab portion is either thinner or completely removed. As a result, the light is more strongly confined at the outer edge of the bus waveguide to mitigate bending losses at its outer sidewall, yet strong optical coupling is enabled between the ring and the inner sidewall of the bus waveguide.

An illustrative embodiment of the present disclosure is an optical modulator comprising a rib-waveguide-based ring resonator and a modulator, where the modulator includes a p-n junction formed in a portion of the ring waveguide of the ring resonator. The p-n junction is configured to enable modulation of a light signal transmitted through the device. The ring waveguide is a conventional rib waveguide having a slab thickness suitable for enabling low-loss propagation of light around the ring. The bus waveguide has an asymmetric slab in the coupling region of the ring resonator. Specifically, its inner bus-slab portion is also the outer ring-slab portion of the ring waveguide, while its outer bus-slab portion laterally tapers down to zero as the bus waveguide proceeds into the coupling region such that this slab portion is non-existent near the center of the coupling region (i.e., its thickness is zero). As a result, the slab portion shared by the ring and bus waveguides facilitates optical coupling between them, allowing a large gap between the ring and bus waveguides without degrading the coupling coefficient of the direction coupler. At the same time, the configuration of the outer bus-slab portion gives rise to strong optical confinement at the outer sidewall of the bus waveguide, enabling it to be tightly bent and also narrow in the coupling region to enable beta matching. Furthermore, such a ring resonator can be fabricated at low cost using conventional technology.

In some embodiments, an optical modulator comprises a p-i-n junction configured to enable modulation of a light signal transmitted through the device.

In some embodiments, the slab portion on the outer side of the bus waveguide is removed completely, but the slab portion on its inner side tapers from zero, well away from the ring waveguide, to a point at which it connects to the slab of the ring waveguide near the coupling region.

In some embodiments, the outer bus-slab portion is not completely removed within the coupling region.

An embodiment in accordance with the present disclosure is a photonic element comprising a ring resonator that includes: a ring waveguide having a first ridge and a first slab having an inner ring-slab portion and an outer ring-slab portion; and a bus waveguide having a second ridge and a second slab having an inner bus-slab portion that is proximal to the first ridge and an outer bus-slab portion that is distal to the first ridge; wherein the ring waveguide and bus waveguide collectively define an asymmetrical coupler having a coupling region, and wherein, within at least a portion of the coupling region: (i) the outer ring-slab portion and the inner bus-slab portion are the same slab portion; and; (ii) the inner bus-slab portion has a first dimension and the outer bus-slab portion has a second dimension that is smaller than the first dimension, wherein the first dimension and second dimension are the same dimension and are selected from the group consisting of width and thickness.

Another embodiment in accordance with the present disclosure is a photonic element comprising a ring resonator that includes: a ring waveguide having an operating wavelength, the ring waveguide including a first ridge; and a bus waveguide comprising a second ridge having an inner edge that is proximal to the first ridge and an outer edge that is distal to the first ridge; wherein the ring waveguide and bus waveguide collectively define an asymmetrical coupler having a coupling region that enables a light signal characterized by the operating wavelength to evanescently couple between the bus waveguide and the ring waveguide; and wherein, within at least a portion of the coupling region, the light signal is more strongly confined at the outer edge than at the inner edge.

Yet another embodiment in accordance with the present disclosure is a method for forming a photonic element comprising a ring resonator comprising an asymmetrical coupler having a coupling region, the method including: forming a ring waveguide having a first ridge and a first slab that includes an inner ring-slab portion and an outer ring-slab portion, the ring waveguide being resonant at an operational wavelength; and forming a bus waveguide having a second ridge and a second slab that includes an inner bus-slab portion that is proximal to the first ridge and an outer bus-slab portion that is distal to the first ridge, wherein the bus waveguide has an inner edge that is proximal to the first ridge and an outer edge that is distal to the first ridge; wherein, within the coupling region, the bus waveguide confines a light signal characterized by the operational wavelength more strongly at the outer edge than at the inner edge.

BRIEF DESCRIPTION OF THE DRAWINGS

FIG. 2 depicts a schematic drawing of a cross-sectional view of actuator 104. The cross-sectional view shown in FIG. 2 is taken through line b-b as seen in FIG. 1A.

FIG. 3 depicts a schematic drawing of a cross-sectional view of an illustrative embodiment of an asymmetric coupler in accordance with the present disclosure.

DETAILED DESCRIPTION

The following terms are defined for use in this Specification, including the appended claims:

Rib waveguide is defined as an integrated-photonics-based optical waveguide disposed on a substrate, where the waveguide includes a central "ridge" having a first thickness and a "slab" having a second thickness that is thinner than the first thickness. In some rib waveguides, a slab can include a slab portion on only one side of the ridge.

Asymmetric coupler is defined as a directional coupler for optically coupling a ring waveguide and a bus waveguide at a coupling region of a ring resonator configuration, wherein, within the coupling region, the bus waveguide has stronger optical confinement for a light signal at an edge distal to the ring waveguide than at an edge proximal to the ring waveguide.

Figures 1A, 1B:
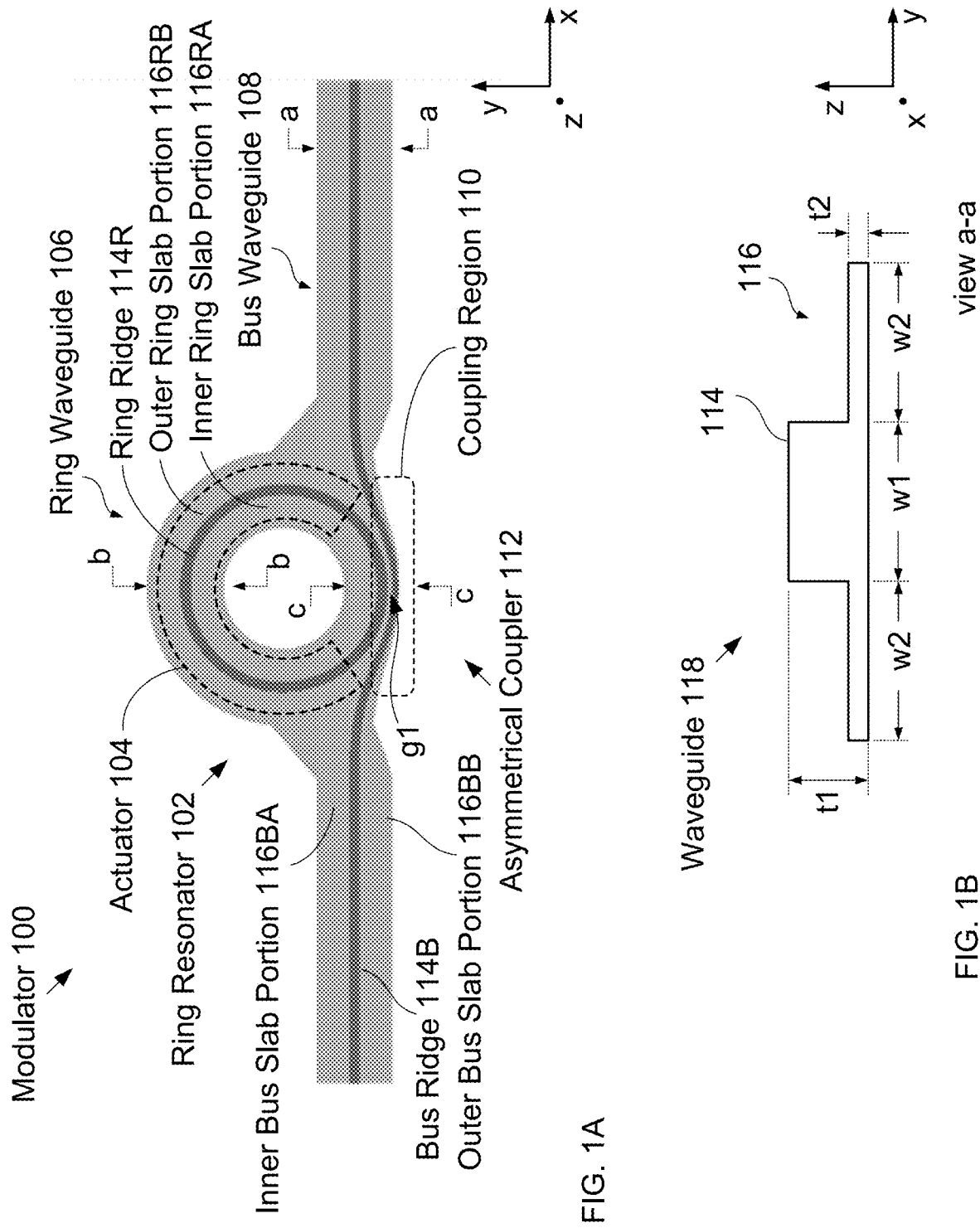
FIG. 1A depicts a schematic drawing of a top view of an integrated-optics-based optical modulator in accordance with the present disclosure.
FIG. 1B depicts a schematic drawing of a cross-sectional view of a waveguide structure that is representative of each of ring waveguide 106 and bus waveguide 108 outside the area of asymmetrical coupler 112.

FIG. 1A depicts a schematic drawing of a top view of an integrated-optics-based optical modulator that includes an asymmetric coupler in accordance with the present disclosure. Modulator 100 comprises ring resonator 102 and actuator 104. Modulator 100 is operative for modulating the intensity of a wavelength signal for which ring resonator 102 is resonant (i.e., the "operational wavelength" of the ring resonator) by applying an electrical signal to actuator 104. It should be noted that, although the illustrative embodiment is a modulator, asymmetric couplers in accordance with the present disclosure can be used in myriad alternative photonic devices, such as spectral filters, optical power splitters, optical power combiners, and the like.

Ring resonator 102 includes ring waveguide 106 and bus waveguide 108. Ring waveguide 106 and bus waveguide 108 are arranged such that bus waveguide 108 wraps around the outside of ring waveguide 106 in coupling region 110 to collectively define asymmetrical coupler 112. Each of ring waveguide 106 and bus waveguide 108 is a rib waveguide having a central ridge and a slab comprising a slab portion on either side of the ridge, where the slab is formed by partially etching the silicon located on either side of the ridge. As a result, a rib waveguide is sometimes referred to as a "partially etched" waveguide.

FIG. 1B depicts a schematic drawing of a cross-sectional view of a waveguide structure that is representative of each of ring waveguide 106 and bus waveguide 108 outside the area of asymmetrical coupler 112. The cross-sectional view shown in FIG. 1B is taken through line a-a as seen in FIG. 1A.

Waveguide 118 is a conventional rib waveguide comprising ridge 114 and slab 116. Ridge 114 has width w1 and thickness t1, while slab 116 has thickness t2. The values of w1, t1, and t2 are selected to enable single-mode operation of the ring for the wavelength signals within the FSR of ring waveguide 106.

Actuator 104 includes a portion of ring waveguide 106 in which a lateral p-n junction is formed.

FIG. 2 depicts a schematic drawing of a cross-sectional view of actuator 104. The cross-sectional view shown in FIG. 2 is taken through line b-b as seen in FIG. 1A.

Actuator 104 is a conventional depletion-mode microring modulator that includes p-n junction 202 formed in ring waveguide 106 by lightly doping ridge 114R in conventional fashion to form adjacent n and p regions. Highly doped n+ and p+ regions are formed in inner ring-slab portion 116RA and outer ring-slab portion 116RB, respectively, to facilitate making electrical contact to p-n junction 202 from a pair of bond pads (not shown). Locating the highly doped n and p regions in the slab of ring waveguide 106 also provides separation of the highly doped contact layers from the waveguide. It should be noted that, in some embodiments, the positions of the n- and p-doped regions and their corresponding n+ and p+ regions within ring waveguide 106 are reversed. In other words, in some embodiments, the p and p+ regions are on the inside portion of ring waveguide 106 and the n and n+ regions are located in the outside portion of the ring waveguide.

In some embodiments, actuator 104 includes a different modulator, such as a phase-control element (e.g., a heater, etc.) that is operatively coupled with ring waveguide 106 to enable wavelength tuning of the ring resonator via the thermo-optic effect, whereby the refractive index of the waveguiding materials is controlled by controlling their temperature. In some embodiments, both a p-n (or p-i-n junction) and a heater are operatively coupled with a ring resonator.

It should be noted that rib waveguides are preferred for use in many ring-resonator-based applications, such as silicon-photonic modulators, spectral filters, and the like. Furthermore, rib waveguides are particularly desirable for use in p-n-junction-based modulators because they maintain optical confinement, enable current flow, and allow for separation of the highly doped contact layers from the waveguide. However, their relatively lower mode confinement gives rise to a larger minimum bend radius than a channel waveguide (also referred to as a "fully etched" waveguide), which is a drawback in some applications.

It is an aspect of the present disclosure that a bus waveguide included in a directional coupler can be configured such that it has (1) a good coupling coefficient with a small-diameter ring waveguide and (2) high mode confinement on its outer edge to mitigate bend losses, thereby enabling a tightly curved bus waveguide.

FIG. 3 depicts a schematic drawing of a cross-sectional view of an illustrative embodiment of an asymmetric coupler in accordance with the present disclosure. The cross-sectional view shown in FIG. 3 is taken through line c-c as seen in FIG. 1A.

Asymmetric coupler 112 includes a portion of ring-waveguide ridge 114R, a portion of bus-waveguide ridge 114B, and slab portion 302, which physically connects them and facilitates evanescent coupling through gap g1.

In the depicted example, the ring and bus waveguides share the same slab portion within coupling region 110, where the slab portion has thickness t2 (i.e., inner bus-slab portion 116BA and outer ring-slab portion 116RB are the same slab portion).

As bus waveguide 108 transitions into asymmetric coupler 112, it includes adiabatic bends and the width of ridge 114R gradually changes from width w1 to width w3 at the center of coupling region 110. The value of w3 and the tapering function along the length of the bus waveguide are selected such that the propagation constants of the ring and bus waveguides are matched. In addition, the width of outer bus-slab portion 116BB tapers from width w2 to zero. As a result, bus waveguide 108 includes a slab having a slab portion only on its inner edge (i.e., the side proximal to ring waveguide 106).

The presence of the slab portion shared by the ring and bus waveguides (i.e., slab portion 302) enables a high coupling coefficient for ring resonator 102 even with a relatively large gap g1. At the same time, removal of outer bus-slab portion 116BB in coupling region 110 provides strong optical confinement at the outer edge of ridge 114B (analogous to a channel waveguide), thereby reducing bending-mode loss and enabling a tight curve for the bus waveguide. In other words, the lateral taper of outer bus-slab portion 116BB down to zero enables a highly compact, low loss, beta-matched directional coupler that has a wide range of selectable coupling coefficients.

As a result, asymmetric couplers in accordance with the present disclosure afford significant advantages over the prior art, including:
i. high mode confinement that enables a small diameter ring waveguide, thereby providing large FSR; or
ii. high coupling coefficient due to shared slab portion between ridges; or
iii. large coupling gap in the coupling region, thereby enabling the use of conventional fabrication technology; or
iv. any combination of i, ii, and iii.

It should be noted that, in some embodiments, outer bus-slab portion 116BB is not tapered completely down to zero and, therefore, some outer bus-slab portion remains throughout the length of coupling region 110. Furthermore, in some embodiments, the thickness of outer bus-slab portion 116BB, rather than its width, is reduced relative to inner bus-slab portion 116BA. In some embodiments, both the width and the thickness of outer bus-slab portion 116BB is reduced relative to inner bus-slab portion 116BA.

Figure 4:
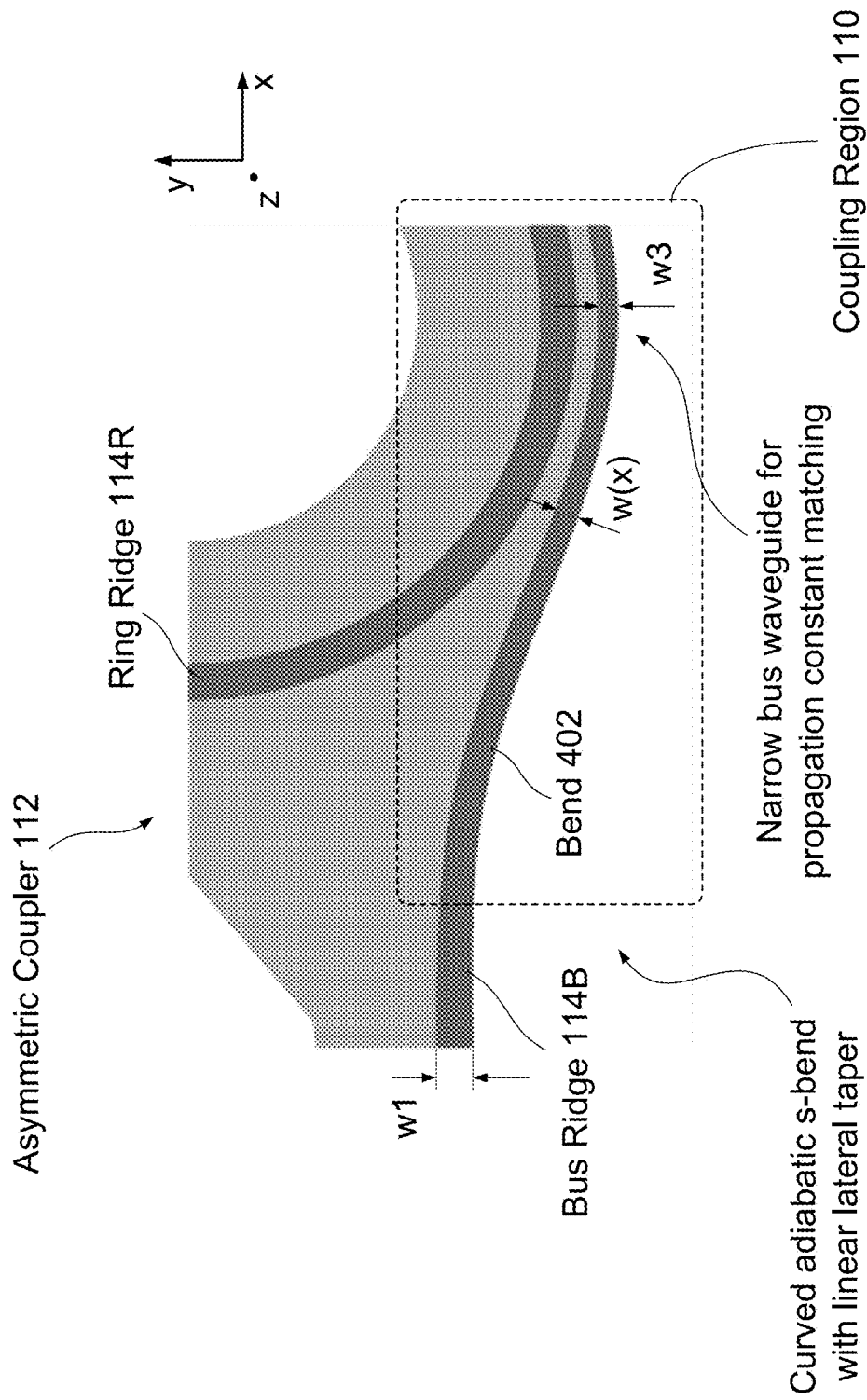
FIG. 4 depicts a schematic drawing of an enlarged top view of asymmetric coupler 112.

FIG. 4 depicts a schematic drawing of an enlarged top view of asymmetric coupler 112. As denoted in the figure, bus waveguide transitions into coupling region 110 via bend 402, which is a curved adiabatic s-bend. In the depicted example, bend 402 is a Euler bend; however, myriad alternative adiabatic bends (e.g., Bezier splines, sine curvature bends, sine bends, polynomial bends, etc.) can be used without departing from the scope of the present disclosure. In some embodiments, bend 402 is not an adiabatic bend.

In addition, the width, w(x), of bus ridge 114B also tapers from width w1 to width w3 as bus waveguide 108 transitions into coupling region 110. In the depicted example, w(x) is a linear function; however, any of a wide range of tapering functions (linear or non-linear) can be used without departing from the scope of the present disclosure. It should also be noted that bus ridge 114B can be tapered to width w3 before curve 402.

Figure 5:
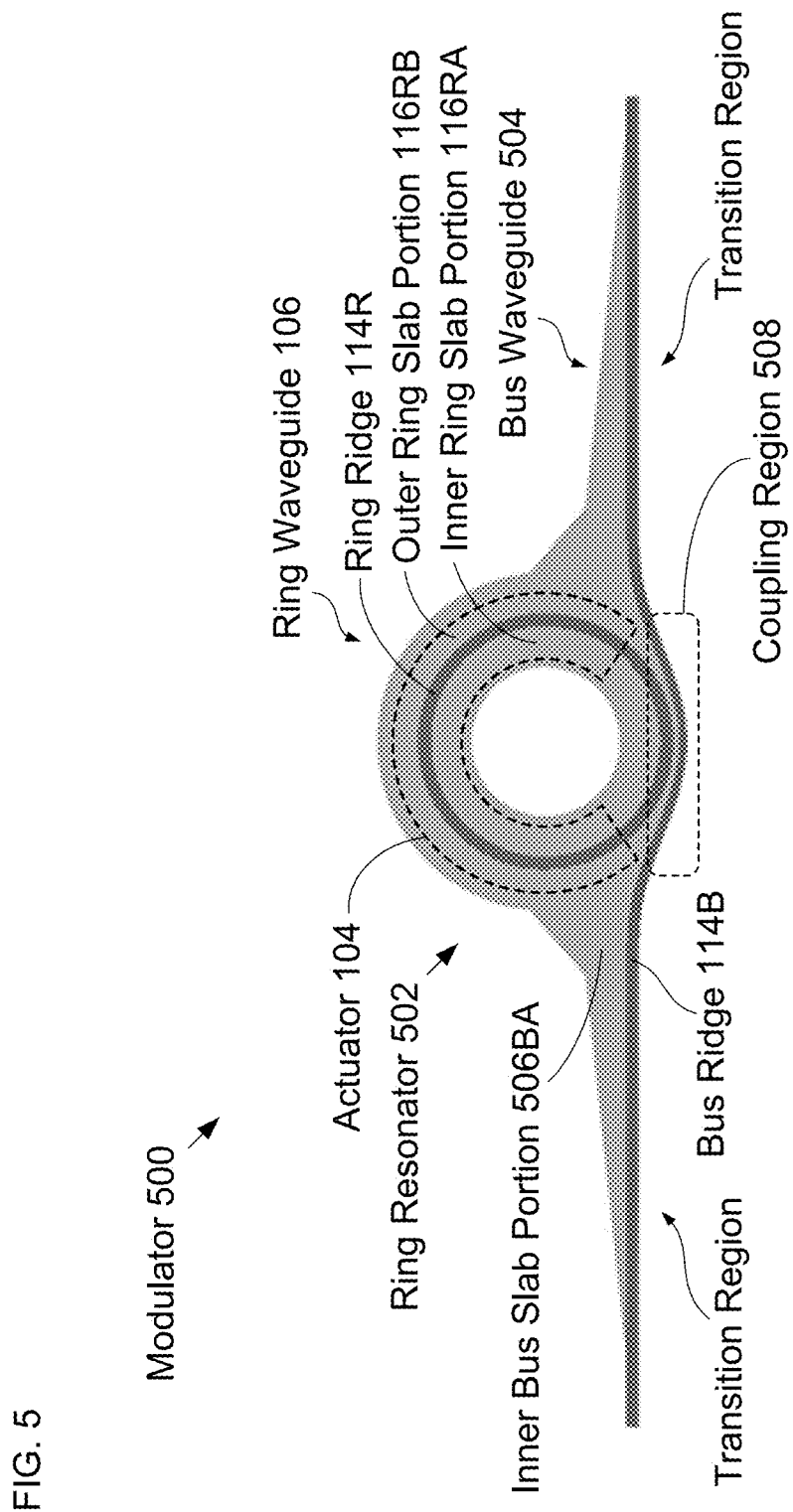
FIG. 5 depicts a schematic drawing of a top view of an alternative embodiment of a modulator in accordance with the present disclosure.

FIG. 5 depicts a schematic drawing of a top view of an alternative embodiment of a modulator in accordance with the present disclosure. Modulator 500 comprises ring resonator 502 and actuator 104.

Ring resonator 502 is analogous to ring resonator 102; however, ring resonator 502 includes a bus waveguide 504, which has an inner slab portion 506BA only in the proximity of the coupling region and no outer slab portion at all in the proximity of ring resonator 502. In the depicted example, inner slab portion 506BA is laterally tapered from zero well away from the coupling region of ring resonator 102 to a width that enables it to connect with outer ring-slab portion 116RB as it nears the coupling region.

In other words, ring resonator 506 includes a bus waveguide that is a "channel waveguide" (a.k.a., a "fully etched waveguide") well away from coupling region 508 but is an "asymmetrically etched" waveguide in the vicinity of the coupling region. Specifically, within coupling region 508 and in "transition regions" on either side of the coupling region, bus waveguide 504 is fully etched on its side distal to ring ridge 114R but is "partially etched" on its side proximal to the ring ridge.

It is to be understood that the disclosure teaches just some examples of embodiments in accordance with the present disclosure and that many variations of the invention can easily be devised by those skilled in the art after reading this disclosure and that the scope of the present invention is to be determined by the following claims.

What is claimed is:

1. A photonic element comprising a ring resonator that includes:
   a ring waveguide having a first ridge and a first slab having an inner ring-slab portion and an outer ring-slab portion; and
   a bus waveguide having a second ridge and a second slab having an inner bus-slab portion that is proximal to the first ridge and an outer bus-slab portion that is distal to the first ridge;
   wherein the ring waveguide and bus waveguide collectively define an asymmetrical single-polarization coupler having a coupling region, and wherein, within at least a portion of the coupling region:
   (i) the outer ring-slab portion and the inner bus-slab portion are the same slab portion; and
   (ii) the inner bus-slab portion has a first dimension and the outer bus-slab portion has a second dimension that is smaller than the first dimension, wherein the first dimension and second dimension are the same dimension and are selected from the group consisting of width and thickness; and (iii) the outer bus slab portion is configured to enable beta-matching between the bus waveguide and the ring waveguide.

2. The photonic element of claim 1 wherein the second width is zero.

3. The photonic element of claim 1 further comprising a modulator that is operative for modulating a light signal propagating through the bus waveguide.

4. The photonic element of claim 3 wherein the modulator comprises a p-n junction, and wherein the ring waveguide includes the p-n junction.

5. The photonic element of claim 1 wherein, within the coupling region, the second ridge has a third width that is non-uniform.

6. The photonic element of claim 1 wherein, within the coupling region, the bus waveguide includes an adiabatic bend that is selected from the group consisting of a Euler bend, an s-bend, a Bezier spline, a sine curvature bend, a sine bend, a polynomial bend, and a circular bend.

7. The photonic element of claim 1 wherein at least in the coupling region, the outer bus slab portion is tapered.

8. A photonic element comprising a ring resonator that includes:
- a ring waveguide having an operating wavelength, the ring waveguide including a first ridge; and
- a bus waveguide comprising a second ridge having an inner edge that is proximal to the first ridge and an outer edge that is distal to the first ridge, the bus waveguide further including an inner bus-slab portion and an outer bus-slab portion;
- wherein the ring waveguide and the bus waveguide collectively define an asymmetrical single-polarization coupler having a coupling region that enables a light signal characterized by the operating wavelength to evanescently couple between the bus waveguide and the ring waveguide; and
- wherein, within at least a portion of the coupling region, the inner bus-slab portion has a first dimension and the outer bus-slab portion has a second dimension that is smaller than the first dimension, the first dimension and second dimension being the same dimension and selected from the group consisting of width and thickness, so that the light signal is more strongly confined at the outer edge than at the inner edge to thereby enable beta-matching.

9. The photonic element of claim 8:
- wherein the ring waveguide further includes an inner ring-slab portion and an outer ring-slab portion; and
- wherein, within at least a portion of the coupling region, the inner bus-slab portion and the outer bus-slab portion are the same slab portion.

10. The photonic element of claim 9 wherein the second width is zero.

11. The photonic element of claim 8 further comprising a modulator that is operative for modulating a light signal propagating through the bus waveguide.

12. The photonic element of claim 11 wherein the modulator comprises a p-n junction, and wherein the ring waveguide includes the p-n junction.

13. The photonic element of claim 8 wherein, within the coupling region, the second ridge has a third width that is non-uniform.

14. The photonic element of claim 8 wherein, within the coupling region, the bus waveguide includes an adiabatic bend that is selected from the group consisting of a Euler bend, an s-bend, a Bezier spline, a sine curvature bend, a sine bend, a polynomial bend, and a circular bend.

15. A method for forming a photonic element comprising a ring resonator comprising an asymmetrical single-polarization coupler having a coupling region, the method including:
- forming a ring waveguide having a first ridge and a first slab that includes an inner ring-slab portion and an outer ring-slab portion, the ring waveguide being resonant at an operational wavelength; and
- forming a bus waveguide having a second ridge and a second slab that includes an inner bus-slab portion that is proximal to the first ridge and an outer bus-slab portion that is distal to the first ridge, wherein the bus waveguide has an inner edge that is proximal to the first ridge and an outer edge that is distal to the first ridge, wherein the outer bus slab portion is configured to enable beta-matching between the bus waveguide and the ring waveguide;
- wherein, within the coupling region, the bus waveguide confines a light signal characterized by the operational wavelength more strongly at the outer edge than at the inner edge.

16. The method of claim 15 wherein the ring resonator is formed such that the inner bus-slab portion has a first width and the outer bus-slab portion has a second width that is smaller than the first width.

17. The method of claim 16 wherein the second width is zero.

18. The method of claim 15 further comprising forming a modulator that is operative for modulating a light signal propagating through the bus waveguide.

19. The method of claim 18 wherein the modulator is formed such that it comprises a p-n junction that is included in the ring waveguide.

20. The method of claim 15 wherein the bus waveguide is formed such that the second ridge has a non-uniform width within the coupling region.

21. The method of claim 15 wherein the bus waveguide is formed such that it includes an adiabatic bend that is selected from the group consisting of a Euler bend, an s-bend, a Bezier spline, a sine curvature bend, a sine bend, a polynomial bend, and a circular bend.

* * * * *